June 2, 1964 L. LEE II 3,135,414
PLUG
Filed June 18, 1962
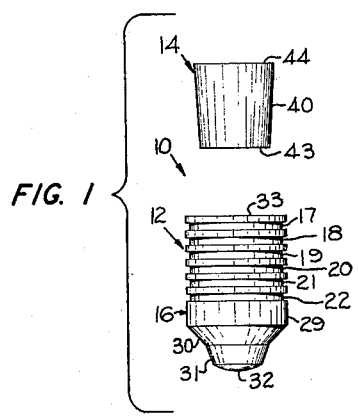
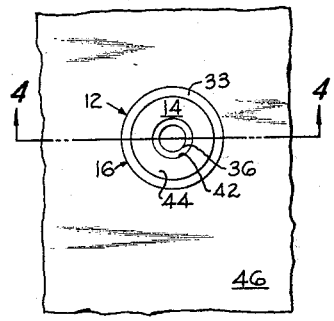
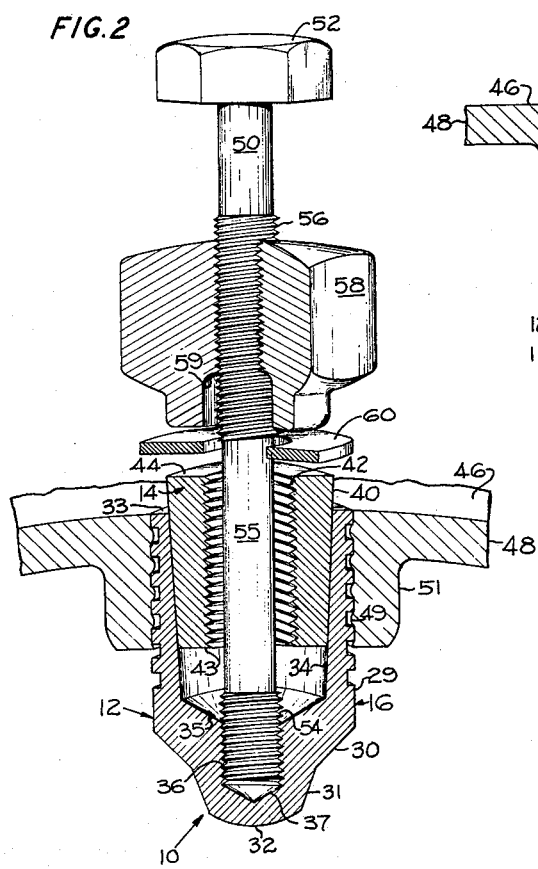
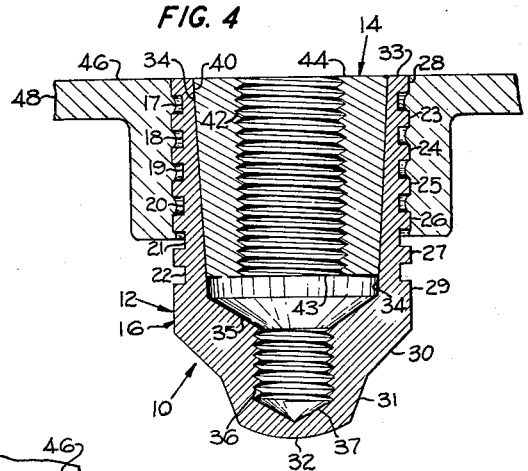
INVENTOR.
LEIGHTON LEE II
BY Lindsey, Brutzman and Hayes
ATTORNEYS United States Patent Office 3,135,414
Patented June 2, 1964

3,135,414
PLUG
Leighton Lee II, Guilford, Conn., assignor to The Lee Company, Westbrook, Conn., a corporation of Connecticut
Filed June 18, 1962, Ser. No. 203,272
4 Claims. (Cl. 220—24.5)

This invention relates to improvements in plugs for closing and sealing openings. More particularly, this invention relates to a novel plug for sealing holes or openings in parts that have extra thin, fragile walls.

In my prior Patent No. 2,821,323, granted January 28, 1958, there is disclosed a unique sealing plug for sealing openings or holes in castings or other solid metal base members without the necessity of tapping the base or providing a threaded seal. Furthermore, the seal described in the aforementioned patent is quite effective in sealing against high pressures. The sealing action is accomplished by radial expansion of a plug under axial movement of a tapered expander pin within the plug. Thus, the plug installation involves exerting axial force on the plug for radial expansion sealing, and this axial force of installation is transferred to the machine part or base member. A base member having a thin or fragile wall might not be able to withstand such force and for this reason, the plug of the aforementioned patent is somewhat limited in installation in thin fragile wall parts. Accordingly, it is an object of this invention to provide a sealing plug and installation assembly for sealing holes in extra thin fragile walls by exerting radial force only during installation of the sealing plug. This makes it possible to utilize the unique sealing features of the plug in sealing extra thin wall cannisters, tanks, piping, ducts and many other similar applications.

It is desirable that a sealing plug be removable and reusable. For untapped holes, the removability of an expanding plug presents a problem. It is a further object of this invention to provide a sealing plug assembly including a plug and expander pin which can be removed and reused.

It is an additional object of this invention to provide an installation bolt assembly which does not break off in the plug and is reusable for installing a number of sealing plugs.

It is a further object of this invention to provide an assembly which will accomplish leak-free and hermetic seals in holes in thin fragile wall parts which is simple and economic to manufacture and easy and foolproof to install.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is an exploded view of the sealing plug assembly of this invention including a sealing plug and expander pin;

FIG. 2 is a sectional elevation of the sealing plug assembly of this invention in a thin wall metal part and an installation bolt assembly partially in section;

FIG. 3 is a plan view of an installed sealing plug assembly; and

FIG. 4 is a sectional view taken along line 4—4 of FIG. 3 showing the sealing plug assembly as installed in a thin wall metal part.

Referring to the drawings, FIG. 1 shows a sealing plug assembly 10 including a sealing plug member 12 and a separate expander pin 14.

The plug member 12 has a cylindrical outer surface 16 of such a diameter to fit easily within a pre-drilled hole in a metal part which may have thin fragile walls. The cylindrical outer surface 16 is provided with a plurality of separate parallel spaced-apart grooves 17, 18, 19, 20, 21 and 22. The outer surface of the plug 12 between these grooves constitutes sealing lands 23, 24, 25, 26 and 27. The top groove 17 is spaced from the top of the plug 12 and forms land 28. The lower end of the plug member 12 is generally cup-shaped and includes a cylindrical portion 29, tapered portions 30 and 31 and a rounded tip 32. The plug 12 also has a flat upper end 33.

The inside of cup-shaped plug 12 includes a tapered bore 34 extending within the plug over the axial portion thereof containing the grooves 17, 18, 19, 20, 21 and 22. The lower end of tapered portion 34 terminates in counterbore 35 leading into a blind hole 37 tapped with threads 36 for installation and extraction.

The expander pin 14 includes a tapered outer surface 40 of a taper matched to that of inside surface 34 of plug 12 so that upon axial movement of the pin 14 within the plug, the mating tapered surfaces 34 and 40 will cause radial expansion of the plug 12 in the area of the sealing lands 23, 24, 25, 26, 27 and 28 for sealing purposes. The pin 14 is generally hollow and cylindrical shaped and the inside surface includes extraction threads 42 on an inside bore of greater diameter than tapped blind hole 37. Pin 14 has a lower flat end surface 43 and an upper flat end surface 44 and, in the embodiment shown, the length of the expander pin 14 between end surfaces 43 and 44 is less than the length of the tapered bore 34 in plug 12.

The plug assembly is particularly adaptable for sealing straight untapped holes in castings or similar machine parts such as metal part 46 having relatively thin fragile walls 48. Of course, the part 46 will also have to have a hole of some axial dimension, for example, hole 49 in casting boss 51.

For expanding the sealing plug assembly an installation bolt assembly is provided. The installation bolt assembly includes an installation bolt 50 having a bolt head 52 and threads 54 on the other end thereof for threadedly engaging the threads 36 of blind hole 37. A portion of the bolt 50 may be unthreaded as at 55 and further threads 56 spaced a suitable distance above threads 54, are provided. A driver nut 58 having a recess 59 is provided on threads 56 and a thrust washer 60 is provided below driver nut 58.

The operation of installing the plug assembly 10 for sealing the hole 49 by means of the installation bolt assembly as well as removing the plug assembly, will now be described. The unexpanded plug 12 is easily inserted into hole 49 in part 46. The hollow expander pin 14 is inserted therein and tapered wall 40 of expander pin 14 abuts against tapered wall 34 of plug 12. For sealing of the hole 49 by the plug 12, the sealing lands 23, 24, 25, etc., are radially expanded as described in the aforementioned patent, the pin 14 is forced axially downward as viewed in FIG. 2. The tapered surfaces 40 and 34 are chosen such that when end 44 of pin 14 is substantially flush with end 33 of plug member 12, the controlled radial expansion provides a pressure-tight seal.

For providing the axial driving force for installation, bolt 50 is threaded into threads 36 in plug member 12 as shown in FIG. 2. The washer 60 and nut 58 are positioned on the bolt 50 as shown in FIG. 2, and the nut 58 is run down. After the thrust washer 60 abuts on surface 44 of pin 14, further downward movement of nut 58 on threads 56 will force pin 14 axially downward. However, the axial force of installation is counteracted by an equal axial force in an opposite direction by means of the bolt 50 being threaded into hole 37. These two axial forces will be equal and opposite and the only force applied to wall 49 in the driving of the expander pin 14 will be radial. Because only radial forces are exerted, the plug is especially useful in sealing extra thin wall cannisters, tanks, piping, ducts and other parts.

For removing the sealing plug assembly 10, after installed as shown in FIG. 4, an extraction bolt or the like (not shown) is threaded into threads 42 of pin 14, and pin 14 is pulled axially upward by means of a striker on the bolt or other conventional pulling means. With the expander pin 14 removed, the plug 12 will contract somewhat allowing it to be pulled from the opening 49. This is accomplished by threading an extraction bolt into threads 36 and pulling it by a striker or other pulling means.

Although the installation bolt assembly is illustrated as a manual bolt with a driver nut for accomplishing the installation, it will be apparent that this simple hand installation tool can be adapted for mass production, for example, using a hydraulic ram for driving after the plug 12 has been engaged to cancel out any axial force.

As will be apparent to persons skilled in the art, various modifications and adaptations of the structure above described will become readily apparent without departure from the spirit and scope of the invention, the scope of which is defined in the appended claims.

I claim:
1. A sealing plug assembly for hermetically sealing unthreaded openings in metal parts having relatively thin fragile walls by radial expansion, while exerting only radial force in such expansion, the plug assembly comprising:
   (a) a plug of generally cup-shaped with a cylindrical outer surface of a diameter to fit easily in an unthreaded hole in a part,
   (b) a plurality of separate spaced-apart non-intersecting annular grooves on the outside of the plug and separate spaced-apart annular sealing lands between the grooves,
   (c) a tapered inside surface within the cup-shaped plug in the same axial portion thereof as the grooves and lands encompass,
   (d) a threaded blind hole in the inside of the closed end of the plug below the tapered inner surface,
   (e) a separate hollow, generally cylindrical-shaped expander pin,
   (f) a tapered outer surface on the expander pin for cooperating with the tapered inner surface on the plug to accomplish radial expansion of the plug for sealing upon relative axial movement of the pin and plug,
   (g) an inner surface of the hollow expander pin having a diameter larger than the diameter of the blind hole to thereby allow installation of the plug by relative axial movement of the plug and expander pin while holding the plug by the tapped blind hole to cancel opposing axial forces and accomplish sealing by radial force only.

2. A sealing plug assembly as defined in claim 1 further comprising; extraction threads on the inner surface of the expander pin and flat outer surface on the expander pin and plug and the taper of the outside surface of the expander pin and the inside surface of the plug being such that when the flat outer surfaces of the pin and plug are flush after axial movement, controlled radial expansion will seal the pin and plug in the opening.

3. A sealing plug assembly for sealing unthreaded openings in parts having thin fragile walls by radial expansion of the plug while exerting only radial force, the plug assembly comprising;
   (a) a plug of generally cup-shaped with a cylindrical outer surface to fit easily into a hole in a part with a thin fragile wall,
   (b) a projecting bottom surface on the cup-shaped plug,
   (c) a plurality of spaced-apart, non-intersecting annular grooves on the outside cylindrical surface of the plug,
   (d) separate spaced-apart annular sealing lands between the grooves,
   (e) a tapered inside diameter on the plug in the same axial portion thereof that the grooves and lands encompass,
   (f) a bind hole in the inside of the closed projecting end of the plug below the tapered inside surface,
   (g) threads in the blind hole for installation and extraction,
   (h) a separate hollow expander pin,
   (i) a tapered outer surface on the expander pin for mating with the tapered inner surface on the plug to accomplish radial expansion of the plug for sealing the opening on axial movement of the pin into the plug,
   (j) a threaded inner surface on the expander pin having an inside diameter larger than the diameter of the blind hole, the threads being for extraction purposes,
   (k) the expander pin having an axial length less than the axial length of the tapered inside portion of the plug and the tapers being such that upon the outer end of the pin and plug being flush after axial movement of the pin, controlled radial expansion for pressure-tight sealing will have taken place,
   (l) separate installation bolt assembly including a headed installation bolt,
   (m) threads on the lower end of the installation bolt for engaging the threaded blind hole,
   (n) additional threads a distance above the lower threads on the bolt,
   (o) a driver nut on the latter threads,
   (p) a thrust washer below the driver nut such that when the installation bolt is threaded into the plug and the driver nut is turned on the threads, the thrust washer will engage the top of the pin to drive the same axially to accomplish the controlled radial expansion while the axial force exerted by the driver nut will be opposed by equal axial force in an opposite direction by the installation bolt engaging the plug such that all axial forces are cancelled and the sealing is by radial force only.

4. A plug assembly for sealing unthreaded openings, particularly in parts having thin walls, comprising:
   (a) a generally cup-shaped plug having a cylindrical outer surface dimensioned to fit into an opening in a part to be sealed,
   (b) a plurality of spaced apart nonintersecting annular grooves on the outer surface of the plug,
   (c) spaced apart annular sealing lands between the grooves on the plug,
   (d) a tapered inner surface on the plug in the same axial portion thereof that the grooves and lands encompass,
   (e) a blind hole in one end of the plug below the tapered inner surface,
   (f) threads in the blind hole for installation and extraction,
   (g) a separate hollow expander pin,
   (h) a tapered outer surface on the expander pin for mating with the tapered inner surface of the plug to accomplish radial expansion of the plug for sealing the opening on axial movement of the pin into the plug, (i) a threaded inner surface on the expander pin having an inside diameter larger than the diameter of the blind hole, the threads on the expander pin being for extraction purposes, (j) a separate installation tool dimensioned to be received through the expander pin, (k) threads on one end of the tool engageable in the threads of the blind hole for holding the plug against axial movement during sealing thereof, and (l) means on the tool engageable with the expander pin for axially moving the expander pin relative to the plug to thereby cause radial expansion of the plug into sealing engagement with the wall of the opening to be sealed.

References Cited in the file of this patent

UNITED STATES PATENTS

| | | |
|---|---|---|
| 1,335,117 | Nielsen | Mar. 30, 1920 |
| 2,821,323 | Lee | Jan. 28, 1958 |